Figure 1:
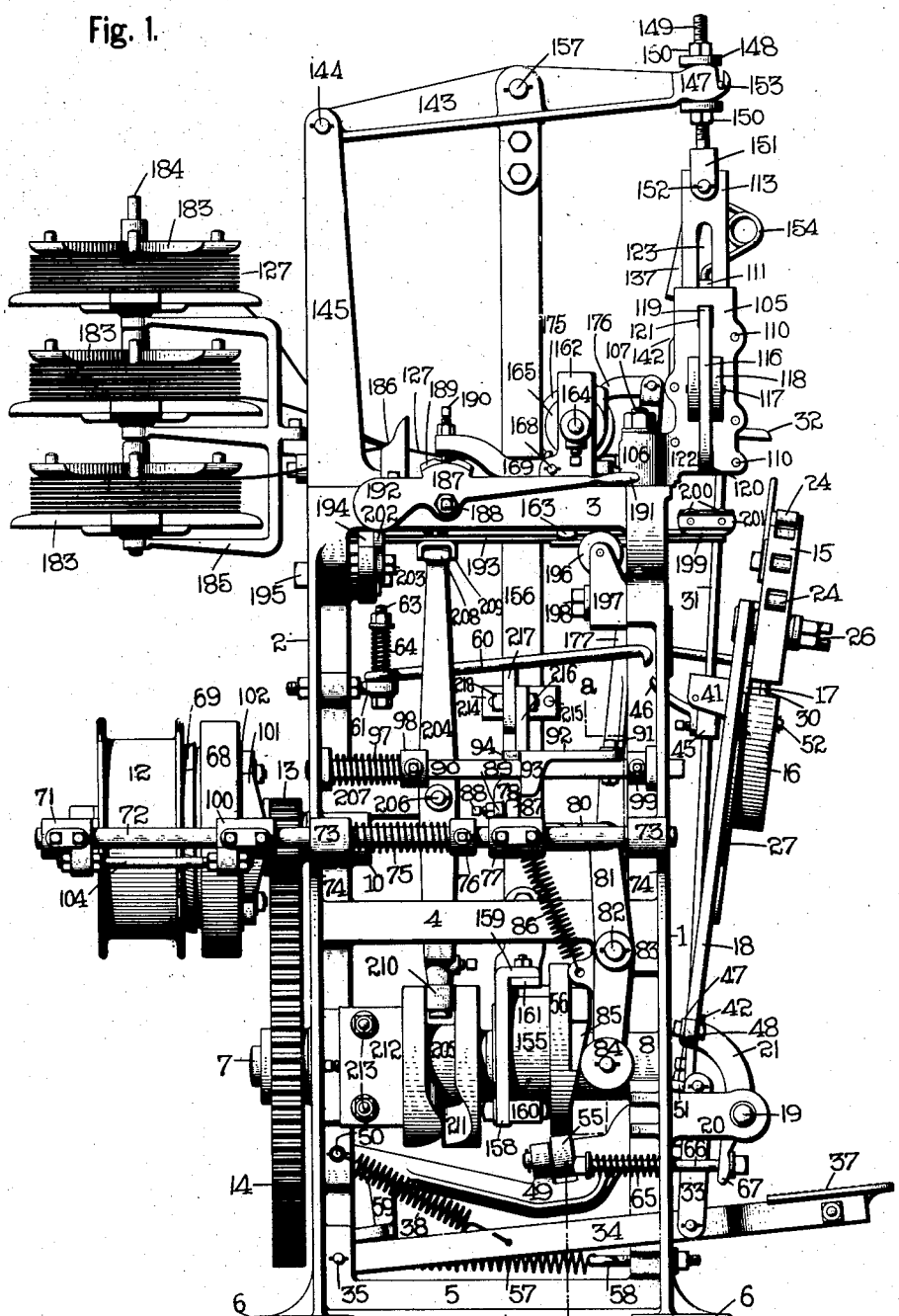

E. F. BEUGLER.
MACHINE FOR MAKING BARREL HOOPS.
APPLICATION FILED DEC. 21, 1911.

1,062,874.

Patented May 27, 1913.
13 SHEETS—SHEET 5.

Witnesses.
Mary M. Kean
George A. Neubauer.

Edwin F. Beugler. Inventor.
By A. J. Sangston Attorney.

E. F. BEUGLER.
MACHINE FOR MAKING BARREL HOOPS.
APPLICATION FILED DEC. 21, 1911.

1,062,874.

Patented May 27, 1913.
13 SHEETS—SHEET 6.

Witnesses.
Mary M. Klein
George A. Neubauer.

Inventor.
Edwin F. Beugler.
By A. J. Sampton
Attorney.

E. F. BEUGLER.
MACHINE FOR MAKING BARREL HOOPS.
APPLICATION FILED DEC. 21, 1911.

1,062,874.

Patented May 27, 1913.
13 SHEETS—SHEET 7.

Witnesses.
Mary M. Klau
George A. Neubauer.

Inventor.
Edwin F. Beugler
By
Attorney.

E. F. BEUGLER.
MACHINE FOR MAKING BARREL HOOPS.
APPLICATION FILED DEC. 21, 1911.
1,062,874.
Patented May 27, 1913.
13 SHEETS—SHEET 8.
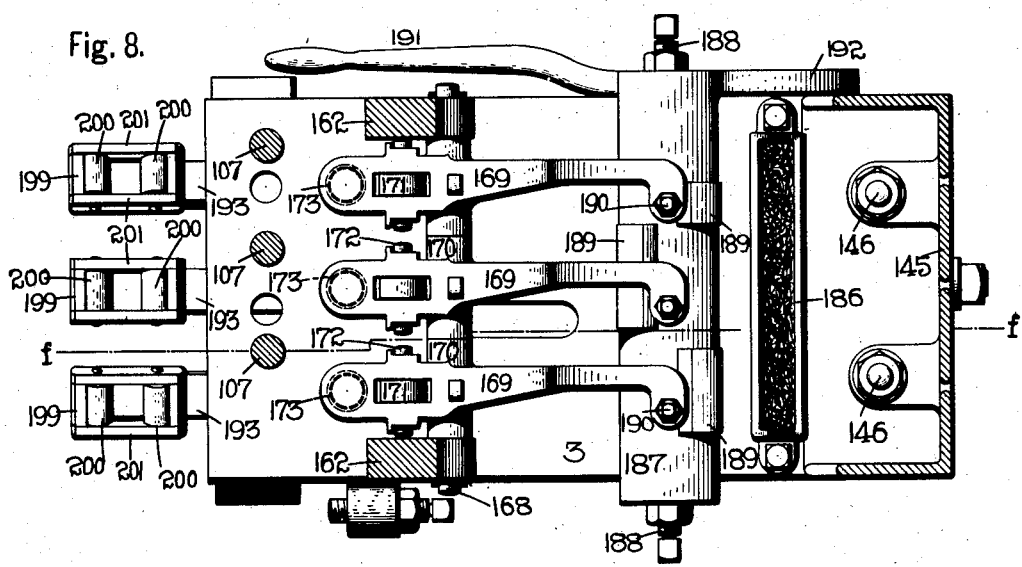
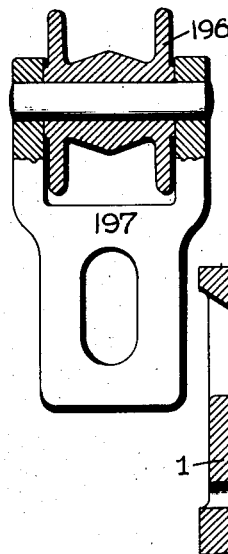
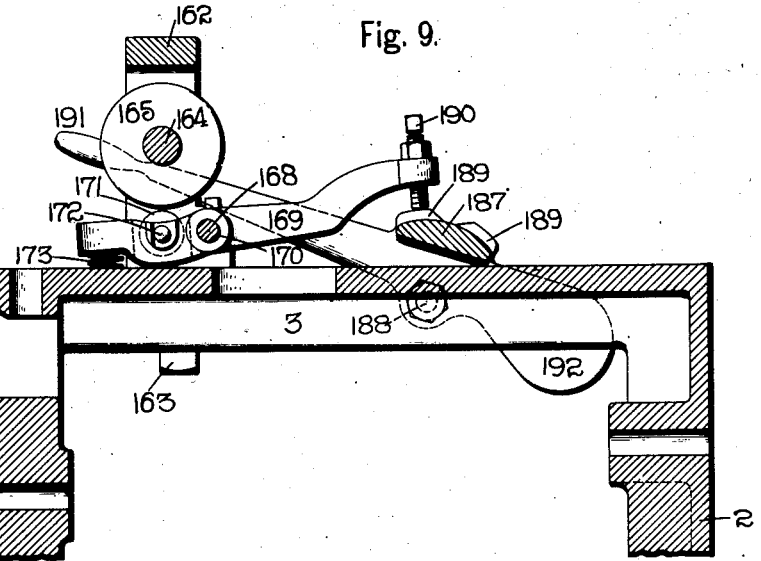
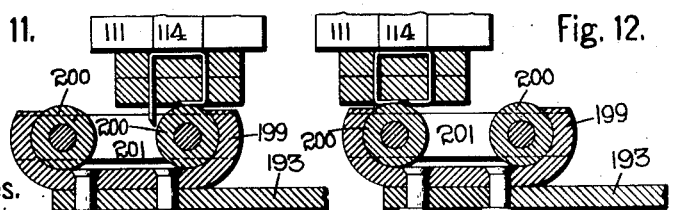
Witnesses.
Mary M. Ryan
George A. Neubauer
Inventor.
Edwin F. Beugler
By A. J. Sampson Attorney.

E. F. BEUGLER.
MACHINE FOR MAKING BARREL HOOPS.
APPLICATION FILED DEC. 21, 1911.

1,062,874.

Patented May 27, 1913.
13 SHEETS—SHEET 9.

Witnesses.
Mary M. Kean
George A. Neubauer.

Inventor.
Edwin F. Beugler.
By
Attorney.

E. F. BEUGLER.
MACHINE FOR MAKING BARREL HOOPS.
APPLICATION FILED DEC. 21, 1911.

1,062,874.

Patented May 27, 1913.
13 SHEETS—SHEET 11.

Witnesses,
Mary M. Kean
George A. Neubauer.

Inventor.
Edwin F. Beugler.
By A. J. Sangster
Attorney.

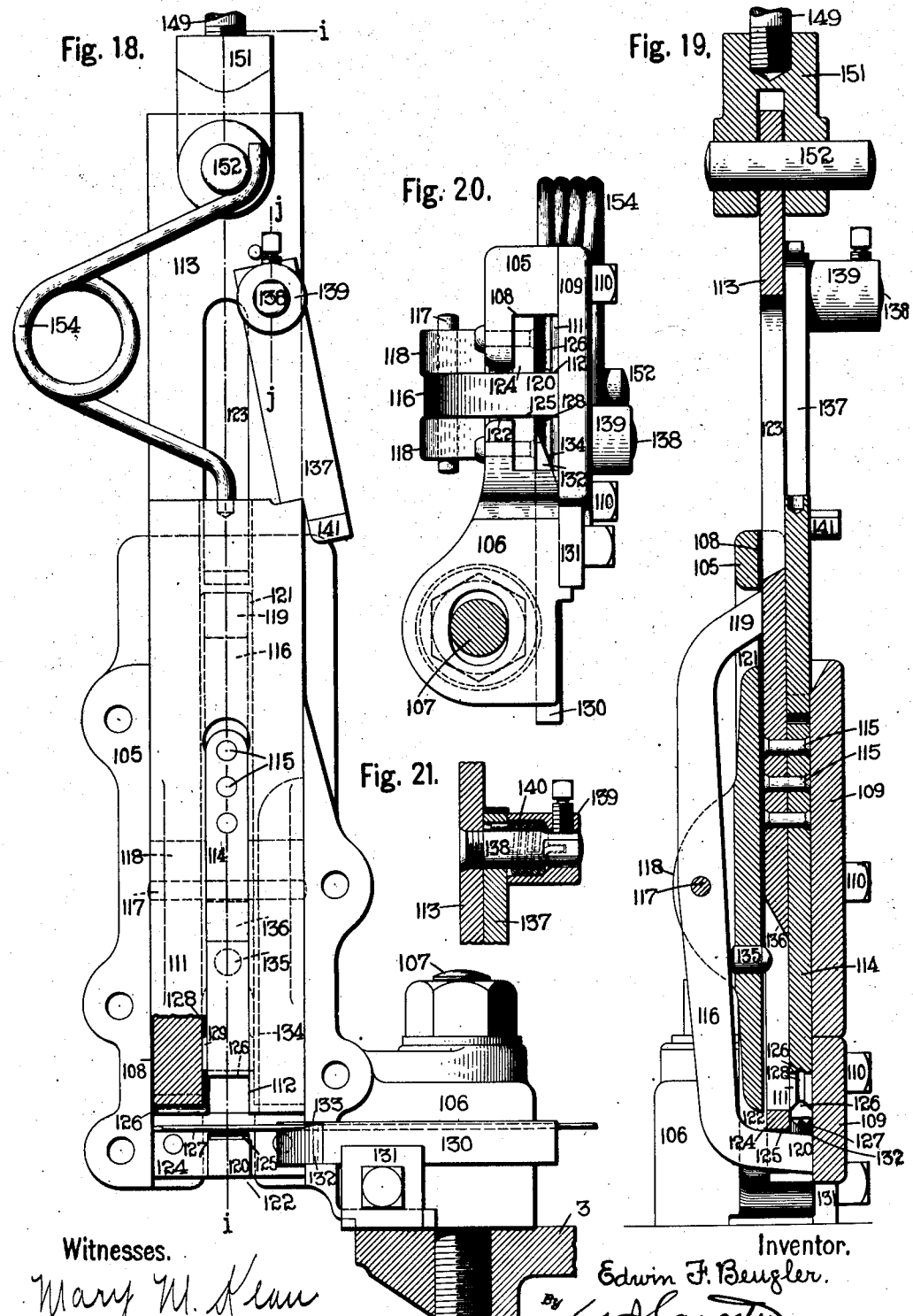

E. F. BEUGLER.
MACHINE FOR MAKING BARREL HOOPS.
APPLICATION FILED DEC. 21, 1911.
1,062,874.
Patented May 27, 1913.
13 SHEETS—SHEET 13.
Fig. 22.
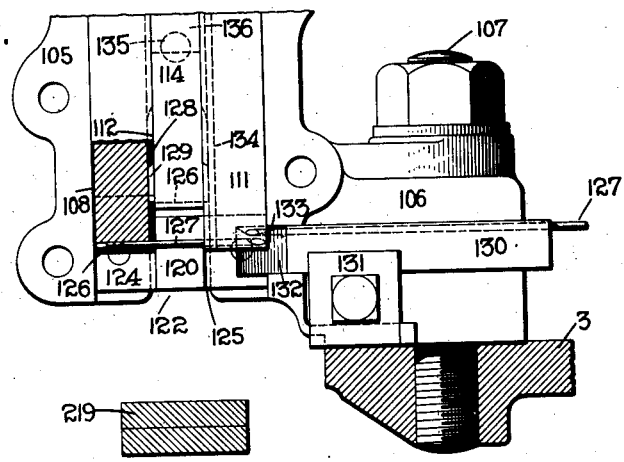
Fig. 23.
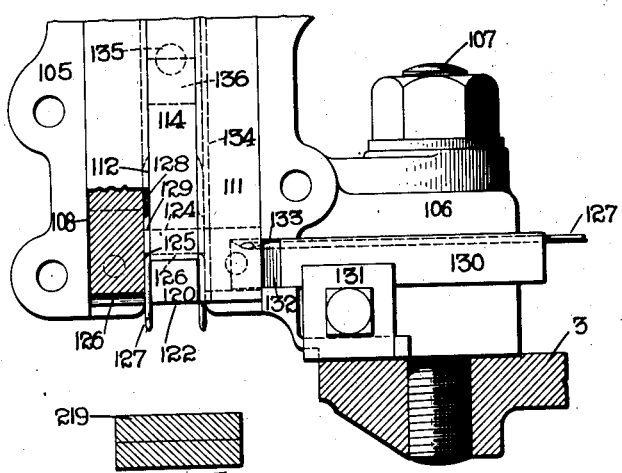
Fig. 24.
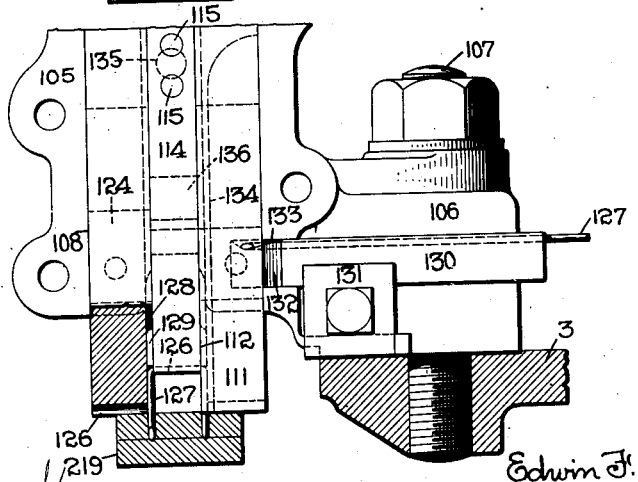
Witnesses.
Mary M. Kvan
George A. Neubauer.
Inventor.
Edwin F. Beugler
By 
Attorney.

UNITED STATES PATENT OFFICE.

EDWIN F. BEUGLER, OF BUFFALO, NEW YORK, ASSIGNOR TO EDWARD B. HOLMES, OF BUFFALO, NEW YORK.

MACHINE FOR MAKING BARREL-HOOPS.

1,062,874.  Specification of Letters Patent.  Patented May 27, 1913.

Application filed December 21, 1911. Serial No. 667,153.

*To all whom it may concern:*

Be it known that I, EDWIN F. BEUGLER, a citizen of the United States, residing at Buffalo, in the county of Erie and State of New York, have invented new and useful Improvements in Machines for Making Barrel-Hoops, of which the following is a specification.

This invention relates to an improved machine for making barrel hoops, and the object of the invention is to produce a machine for the purpose of forming wood barrel hoops and fastening the overlapping ends of the hoops by means of staples driven therethrough; a machine which is comparatively light in weight but unusually strong and durable; practically automatic in operation, yet simple in construction and devoid of all complicated mechanisms and intricate movements which not only render the machine bulky, but easily get out of order, necessitating frequent repairs.

Among the special features of this new and improved barrel hoop making machine, the most prominent are;—a device for forming, sizing and holding the barrel hoop; an automatic mechanism for starting and stopping the machine; a staple forming and driving mechanism; a wire feeding mechanism with a selective attachment whereby any particular wire-feed may be cut out of operation; and an automatic staple clenching mechanism for clenching the ends of the staples after they are driven through the overlapping barrel hoop ends.

There are also minor features embodied in this invention, all of which, together with those above stated, will be fully and clearly described and claimed, reference being had to the accompanying drawings, in which—

Figure 2:
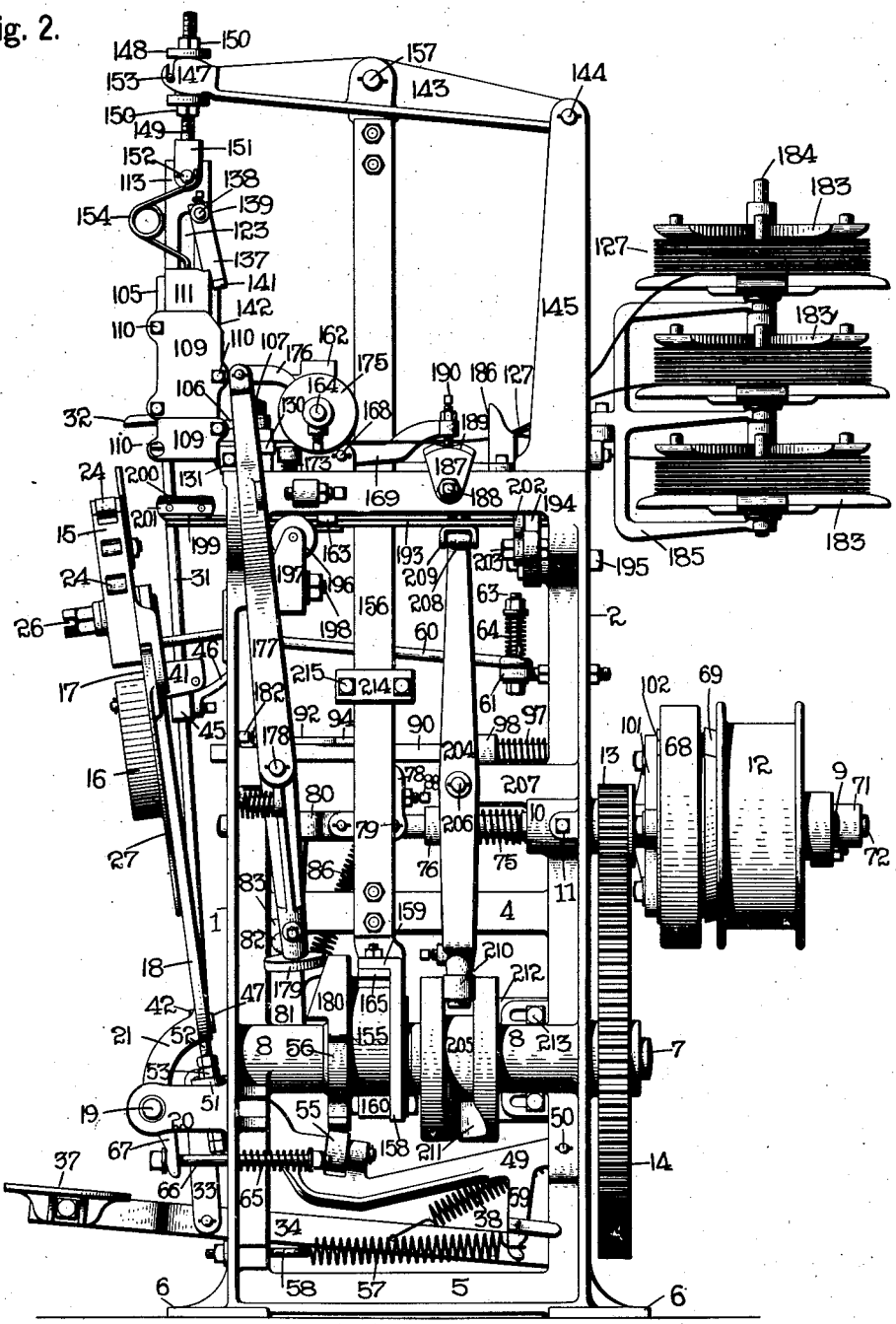
Figure 3:
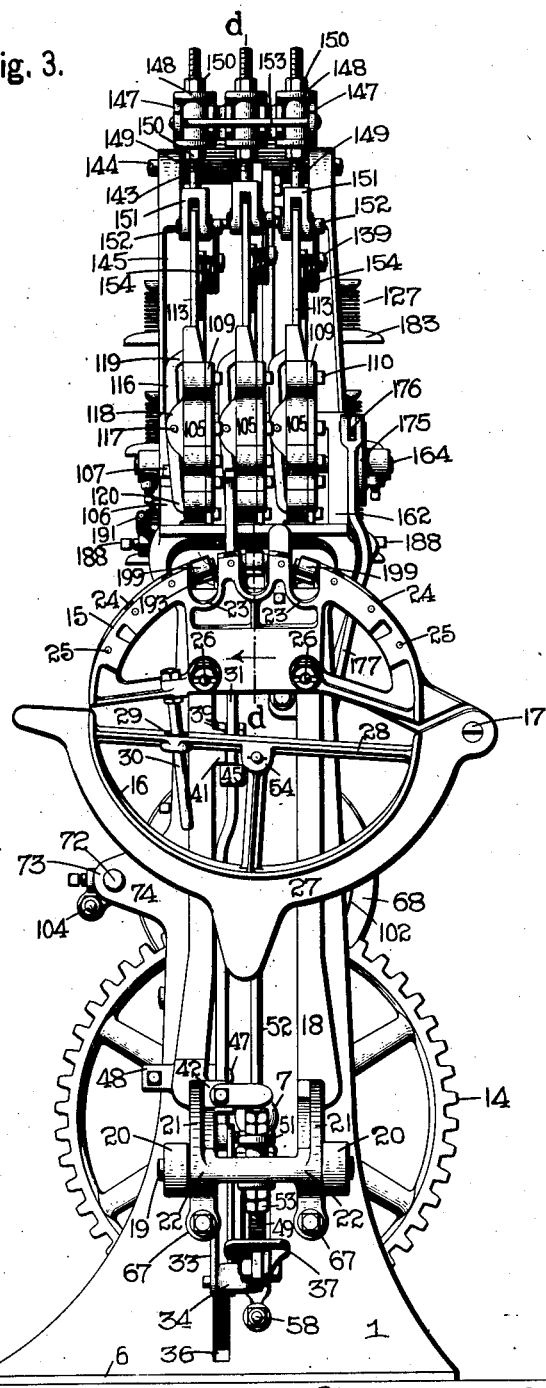
Figure 4:
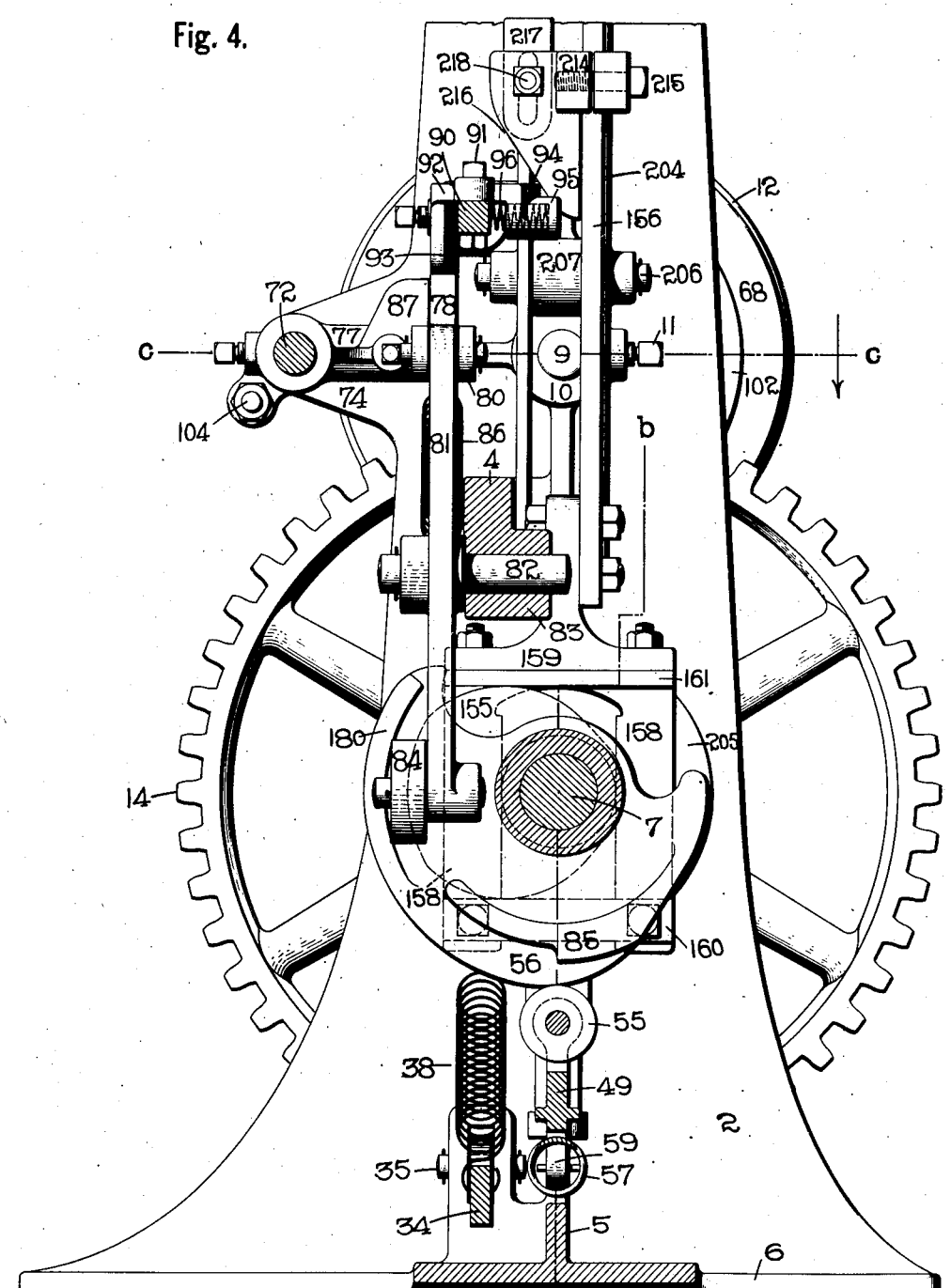
Figure 5:
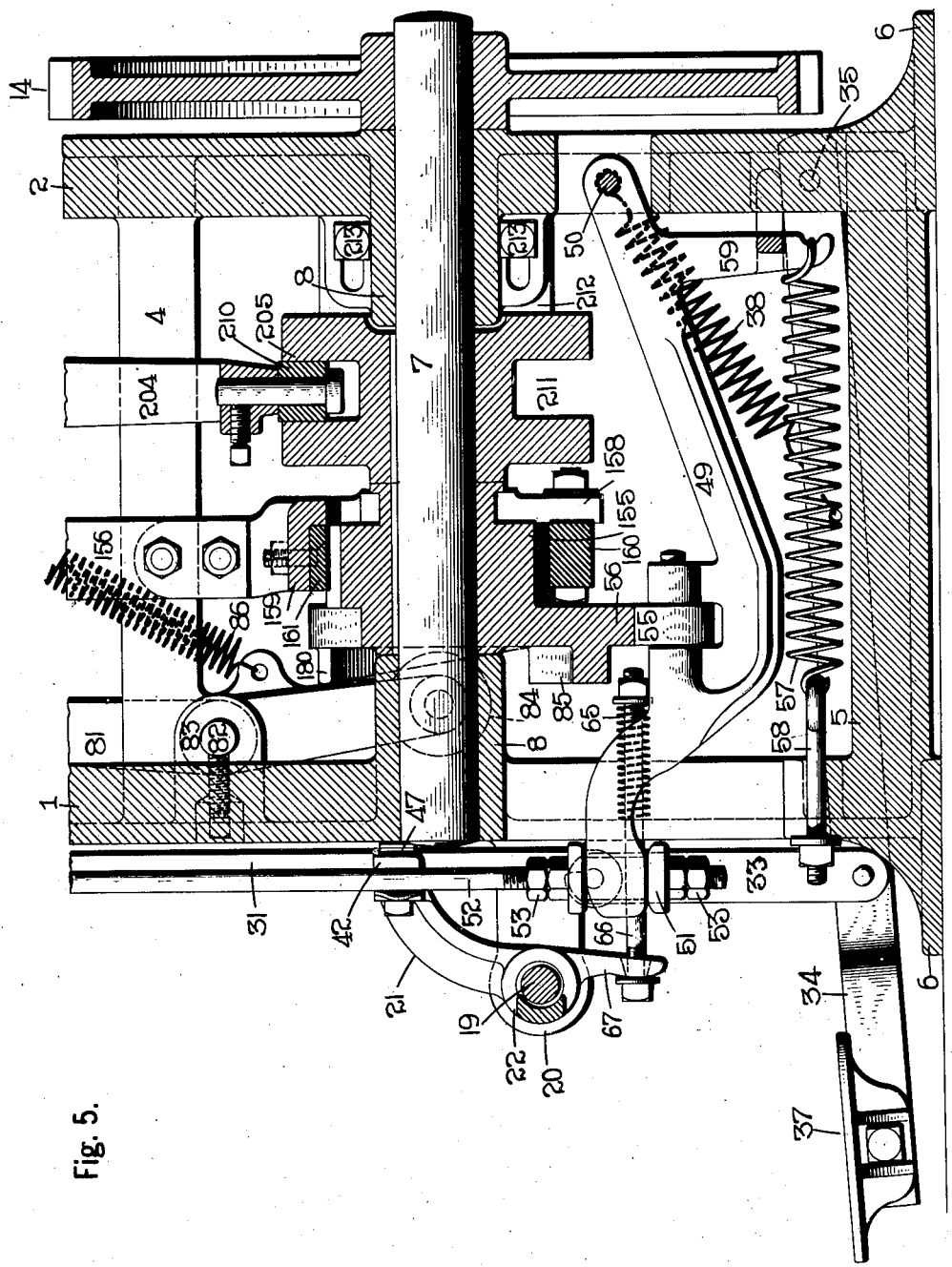
Figure 6:
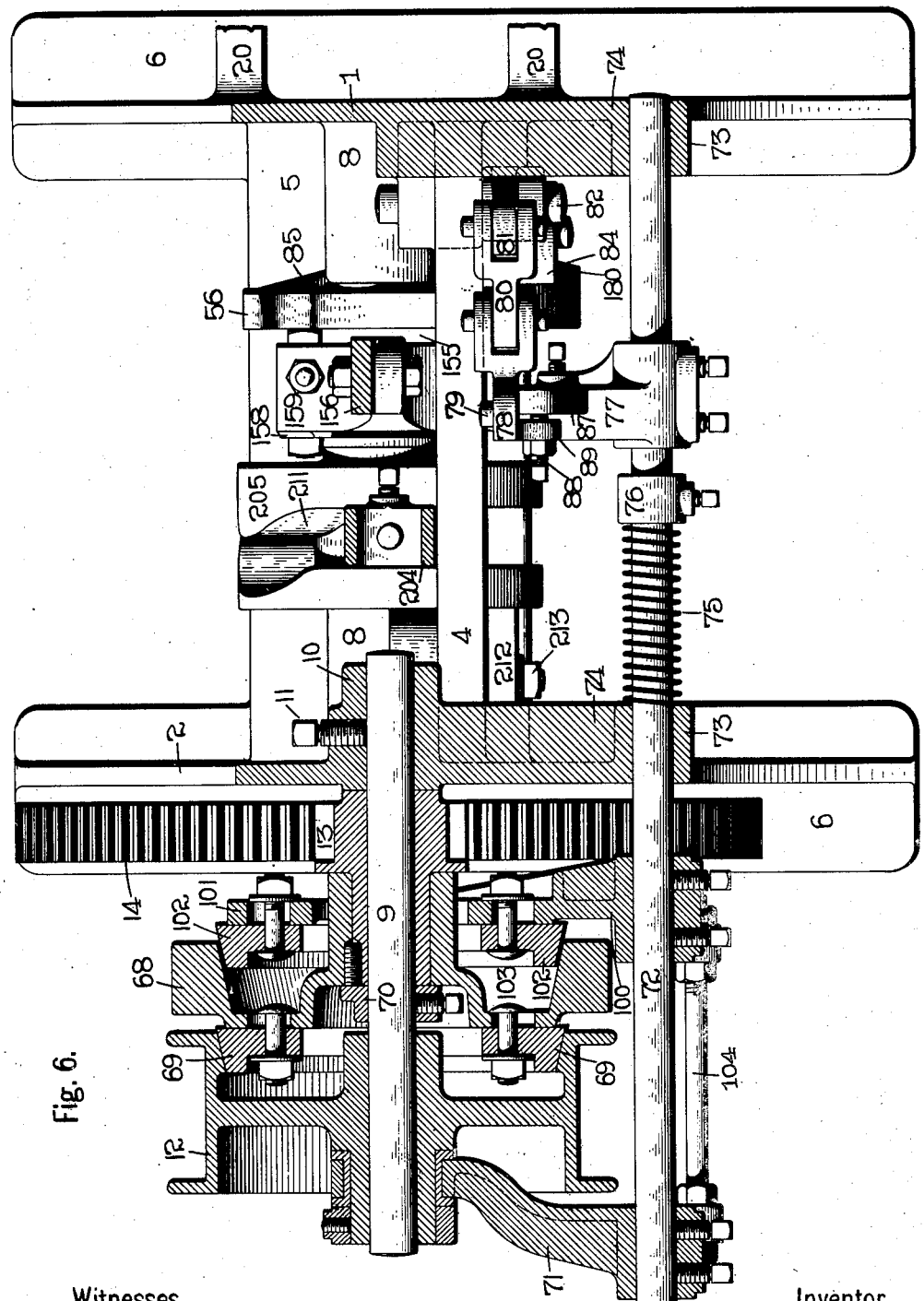
Figure 7:
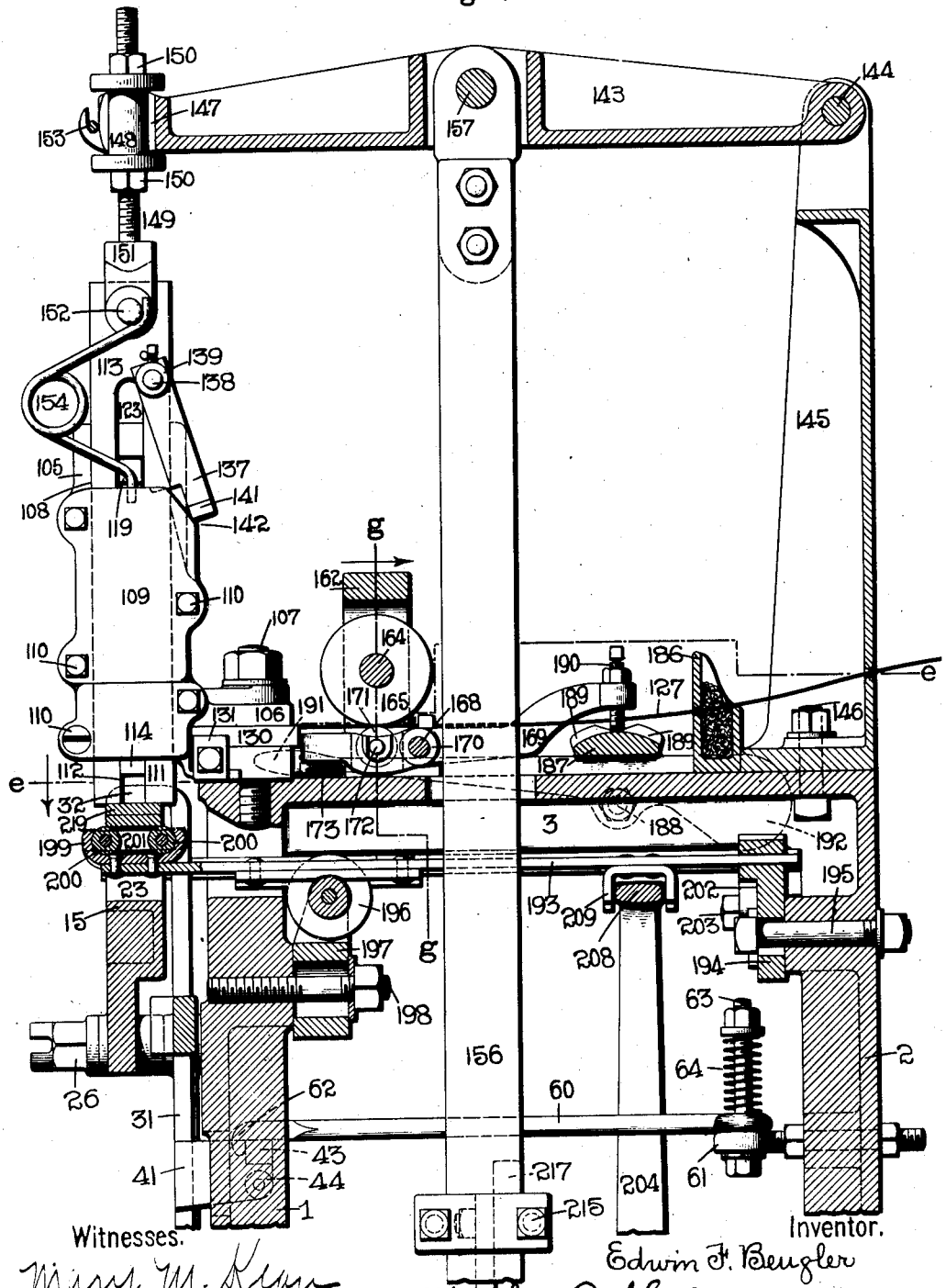
Figure 13:
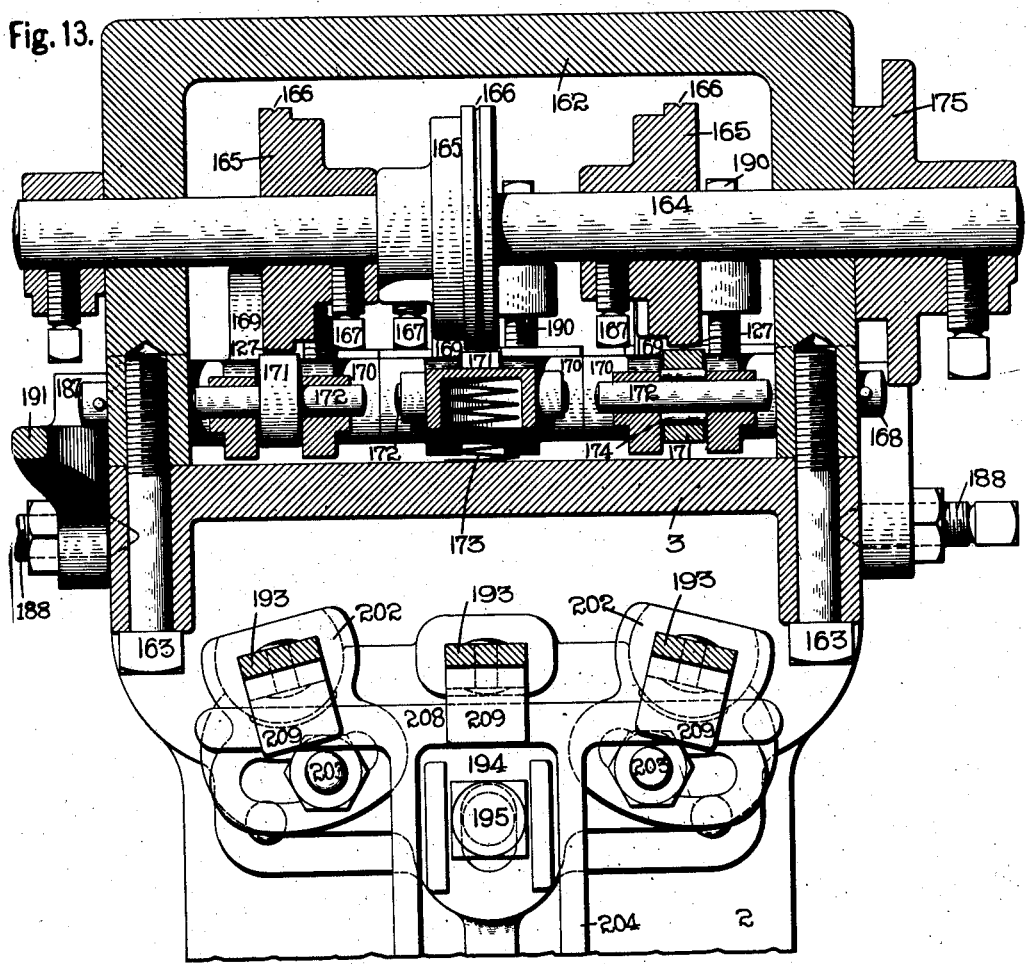
Figure 14:
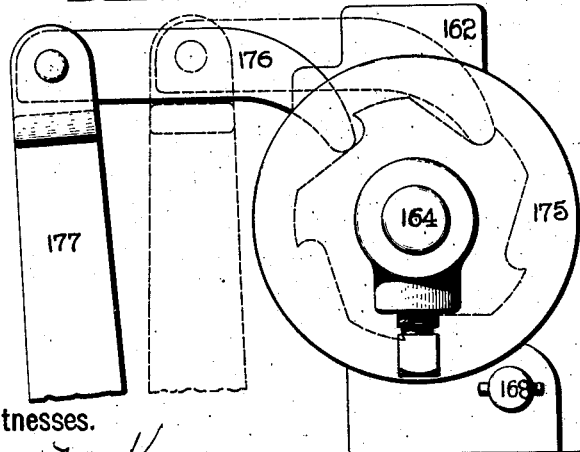
Figure 15:
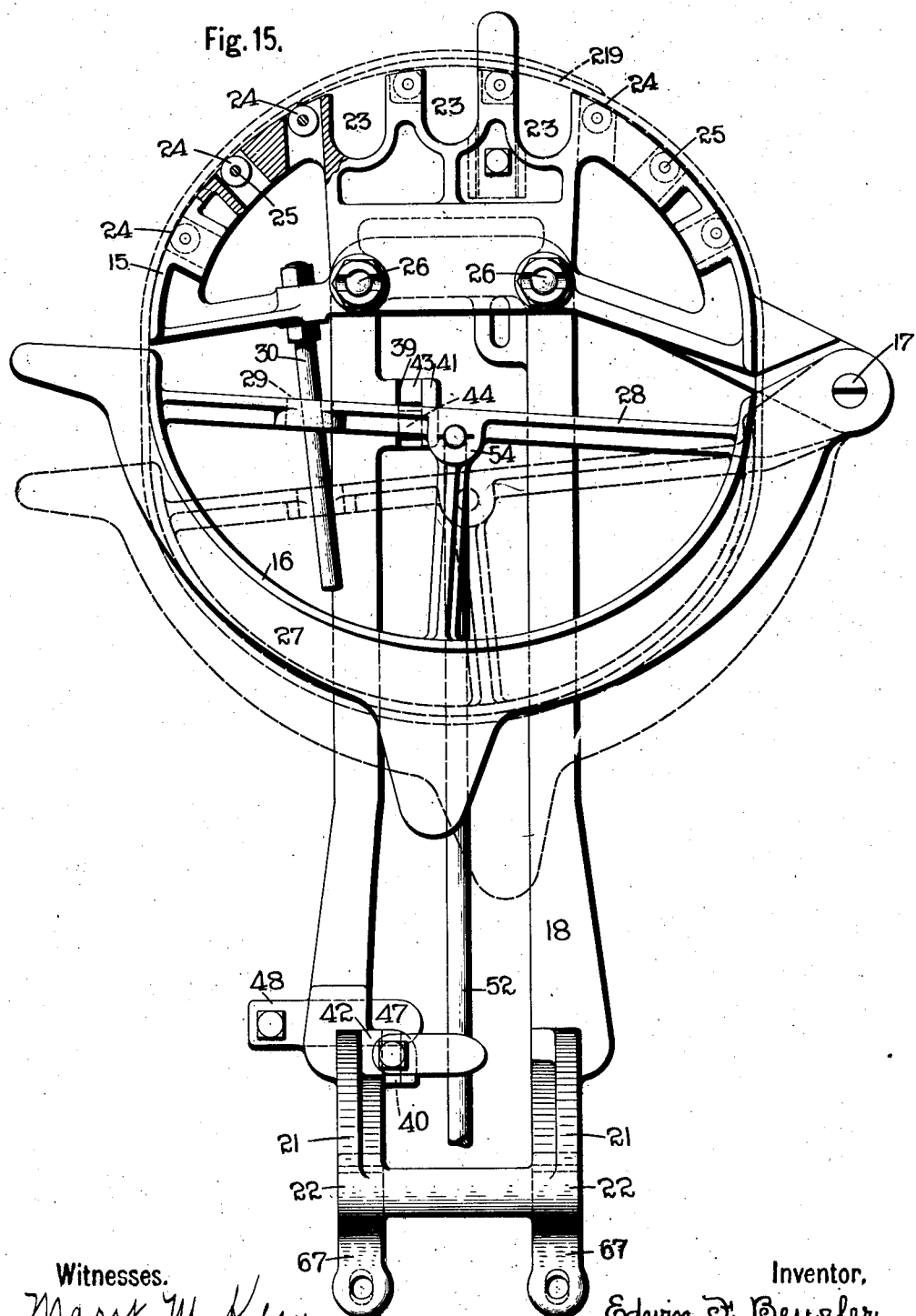
Figure 16:
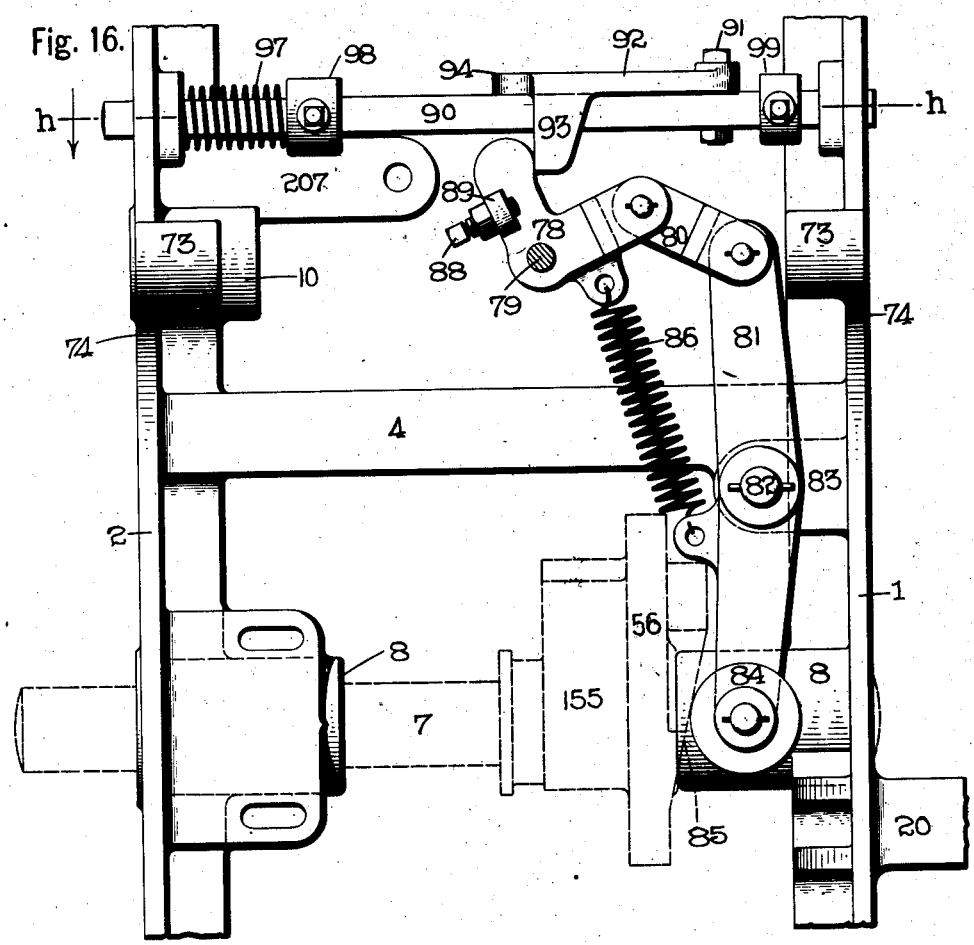
Figure 17:
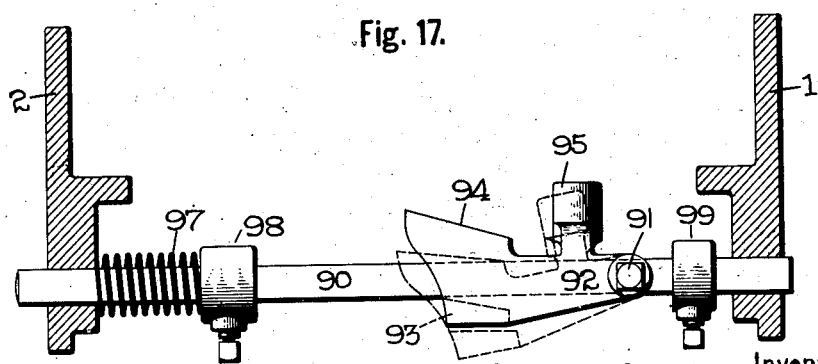

Figure 1 is a left hand side view of the improved barrel hoop machine. Fig. 2 is a right hand side view of the machine. Fig. 3 is a front elevation of the machine. Fig. 4 is an enlarged vertical section through the machine on line $a\ a$, Fig. 1, the mechanism being shown in the position it assumes when sizing the hoop. Fig. 5 is a central section through the machine on line $b\ b$, Fig. 4. Fig. 6 is a transverse horizontal section through the machine on line $c, c$, Fig. 4. Fig. 7 is an enlarged central vertical section on line $d\ d$, Fig. 3, through the upper portion of the machine, the mechanism being shown in position ready to drive the staples through the overlapping ends of the hoop. Fig. 8 is a horizontal section on line $e\ e$, Fig. 7, showing a plan view of a portion of the wire feeding mechanism; the staple forming and driving mechanism and the hoop sizing and holding form being omitted. Fig. 9 is a central transverse section on line $f\ f$, Fig. 8, showing the means for cutting out the wire feeding mechanism. Fig. 10 is an enlarged detached fragmentary sectional view of one of the bevel faced rollers and its supporting block. Figs. 11 and 12 are enlarged detached sectional views showing the device for clenching the staples after they are driven through the hoop. Fig. 13 is an enlarged vertical transverse section on line $g\ g$, Fig. 7, through the wire feeding mechanism, parts thereof being shown in elevation to more clearly disclose the construction. Fig. 14 is an enlarged detached fragmentary view of the device for operating the wire feeding mechanism. Fig. 15 is an enlarged detached front view of the hoop holding and sizing form and its support, showing the form in closed position in full lines, to receive the hoop, and in open or expanded position in dotted lines to form and size the hoop. Fig. 16 is an enlarged fragmentary side elevation of a portion of the machine frame, showing the toggle mechanism which provides for automatically starting and stopping the machine. Fig. 17 is a horizontal section on line $h\ h$, Fig. 16, showing the sliding bar which carries the toggle breaking latch. Fig. 18 is an enlarged detached side elevation of one of the staple forming and driving devices, the covers thereof being removed and a portion shown in section to more clearly illustrate the construction of the mechanism which is depicted in its normal position. Fig. 19 is a central vertical section on line $i\ i$, Fig. 18. Fig. 20 is a bottom view of one of the staple forming and driving devices. Fig. 21 is a section on line $j\ j$, Fig. 18. Figs. 22, 23 and 24 are fragmentary views of the lower portion of the device shown in Fig. 18, the mechanism being shown in the successive positions it assumes when cutting, forming and driving the staple.

In the following description of the machine, each mechanism will, as far as possible, be described in detail in the order in which it operates upon the barrel hoop, and to make the description clear and explicit frequent reference will be made to the drawings in which like numerals designate like parts.

*The machine frame and driving mechanism.*—The machine frame is preferably formed of a single casting as shown in Figs. 1 to 6 inclusive, and consists of a vertical front member 1, a vertical rear member 2, a horizontal top member 3 which joins the upper extremities of the front and rear members 1 and 2, a horizontal intermediate member 4 which connects the front and rear members at about their middle and serves as a strengthening piece, and a horizontal bottom member 5 which joins the lower ends of the front and rear members. The vertical members 1 and 2 are provided with supporting feet 6 at their lower extremities through which bolts may be passed to fasten the machine to the floor. The frame as a whole is also provided with various extensions, brackets, bosses and openings for the reception and support of portions of the operating mechanism, but the description of these various parts will be reserved for and included in that of the particular mechanism of which they form a part. Two shafts are carried by the machine frame. One of these, the main shaft 7, is journaled in horizontal bearings 8, formed in the front and rear vertical frame members 1 and 2, between the intermediate and bottom frame members 4 and 5, and the other of which constitutes a stationary counter-shaft 9 which is rigidly supported in a boss 10 formed in the rear frame member 2 above the horizontal main bearings 8. This counter shaft 9 is securely fastened in place by a set screw 11 and extends rearwardly in a horizontal direction beyond the frame of the machine. It carries a driving pulley 12 which has both a rotative and a sliding movement thereon, and a pinion 13 free to rotate on the shaft but locked against longitudinal movement thereon. This pinion 13 supports a clutch device adapted to engage the driving pulley 12, in the manner hereinafter described. It also meshes with a large spur gear wheel 14 which is rigidly fastened upon the projecting rear end of the main shaft 7 and provides a means for rotating said shaft.

*The hoop forming, sizing and holding mechanism.*—The mechanism for forming, sizing and holding the barrel hoop is located chiefly in front of the machine and is clearly illustrated in Figs. 1, 2, 3, 4, 5, 7 and 15 of the drawings to which attention is directed in the following description. The hoop form consists of two segmental members 15 and 16 which are hinged together at one side as shown at 17. They are practically semi-circular in shape and when expanded assume substantially a circular form of the size of the desired hoop. This segmental form is carried at the upper end of a swing-frame 18 which is pivotally supported at its lower end by a horizontal pin 19 mounted in the outer extremities of two outwardly projecting lugs 20 formed integral with the front frame member 1 and located near the bottom thereof. As will be noted by referring to Figs. 1, 2 and 5, the lower extremity of the swing-frame 18 curves outwardly as shown at 21, and this curved portion carries the bearings 22 through which the supporting pin 19 passes, so that the pivoting point of the swing frame is at some distance from the vertical frame member 1. The purpose of this construction is to afford a certain amount of leverage so that a downward pull upon the hoop form will swing the frame 18 up against the front of the machine frame. The upper segmental hoop form member 15 is provided with a plurality of deep pockets 23 in the upper central part of its peripheral surface, which afford space for the reception and operation of the staple clenchers. In the form of the invention illustrated in the accompanying drawings, there are three such pockets, the number of pockets corresponding with the number of staples driven, and the drawings showing a three staple machine.

Arranged around the periphery of the segmental member 15 is a plurality of radial openings in each of which a small roller 24 is seated with its face projecting an infinitesimal distance beyond the periphery of the segmental member. These rollers are mounted on transverse pivot pins 25 as shown in Figs. 3 and 15 and serve to eliminate the greater portion of the friction incident to the stretching of the hoop when expanding the form. This segmental member 15 is rigidly secured by bolts 26 to the upper extremity of the swing frame 18 in the manner shown in Figs. 7 and 15. The lower segmental hoop form member 16 is connected to the upper member 15 by the hinge 17 and is provided with a wide, peripheral flange 27 which serves as a guard or stop to prevent the hoop from slipping off the form. It also has a transverse bar or spreader 28 formed integral therewith which is provided with a vertical slot 29 through which a depending guide bar 30 carried by the upper segmental member 15 passes. This guide bar serves to guide the lower member 16 in a direct line with the upper member 15 when expanding to size the hoop and prevents any side motion or play.

The barrel hoop is held in place upon the hoop form by means of a hooked bar which is controlled by a food lever. This bar 31 has its upper extremity bent forward to form a hook 32 and its lower extremity connected by a pair of pivotal links 33 to a transversely extending foot lever 34. The foot lever is pivoted by a pin 35 to the rear frame member 2 and extends forwardly and passes through a vertical slot 36 in the front frame member 1, see Figs. 1, 2, 3, 4 and 5. It is provided at its outer extremity with a foot pad 37 and is normally retained in its elevated position by a spring 38.

The hooked bar 31 has a longitudinal up and down movement with respect to the swing frame 18 and is guided in its movement by vertical slots 39 and 40 which are formed in upper and lower lugs 41 and 42 on the swing frame 18. As it is desirable that the hooked bar 31 be retained out of the way when the hoop form is closed in order to permit the easy removal of the hoop, a device is provided whereby the hooked bar 31 is retarded in its movement so that it has not the same range of forward movement as the swing frame. By referring to Figs. 1, 2 and 7, it will be noted that the upper lug 41 extends rearwardly from the swing frame 18 so that the slot 39 is comparatively deep which permits a front and rear movement of the bar 31 therein. The upper rear portion of the slot 39 is spanned by a bridge piece 43 and a roller 44 is pivoted by a pin in the lower rear portion of the slot as shown in dotted lines in Fig. 7. The hooked bar 31 carries a collar 45 which is located just below the point where the bar passes through the slot 39 and is provided with a curved rearwardly projecting finger 46. This finger is adapted to ride the roller 44 when the hooked bar moves upwardly and so draw the bar rearwardly in the slot. The lower portion of the hooked bar is retained in the slot 40 by a flat spring bar 47 which is bolted to a laterally projecting lug 48 on the swing frame 18 and extends horizontally across in the rear of the hooked bar.

The hoop form is expanded to size the hoop by power means consisting of a lever, a connecting rod, and a cam mounted on the main shaft and engaging the lever. The lever 49 is of angular form and is arranged transversely within the machine directly below the main shaft. It has its rear end projecting into a slot in the rear frame member 2 and fulcrumed upon a transverse pin 50. The front end of the lever 49 is forked and straddles a flanged block 51 through which the lower extremity of a vertical connecting rod 52 is passed and adjustably fastened in place by lock nuts 53. The upper end of this connecting rod is bent at right angles and passed through an opening in a boss 54 formed in the transverse bar or spreader 28 of the lower segmental member 16 of the hoop form. The transverse lever 49 has two upwardly extending lugs between which a roller 55 is arranged and pivotally supported upon a pin seated in the lugs. This roller engages the face of a cam 56 which is mounted upon the main shaft 7 directly in the rear of the front bearing 8 and is adapted to depress the lever 49 and thus expand the hoop form by drawing downward upon the connecting rod 52. The lever 49 is maintained in contact with the cam 56 by means of a spring 57, one end of which is fastened to an eye bolt 58 passed through the front frame member 1 and the other end of which is secured to the lower end of a depending arm 59 located near the rear of the lever.

A device is provided for locking the swing frame and hoop form in position after they have been swung back in place against the machine frame. This device is shown in Fig. 7 and consists of a horizontal bar 60, the rear end of which is supported by an eye bolt 61 secured to the rear frame member 2 and the front end of which is bent to form a hook 62 which is adapted to catch over the bridge piece 43 on the lug 41 and so maintain the swing frame in position against the front of the machine. The rear end of the bar 60 is bent to form an eye, and a bolt 63 is passed through both this eye and the eye bolt 61, and is encircled by a spring 64 which serves to maintain the bar in locking position with a spring tension.

The swing frame 18 is swung away from the machine after the lock bar 60 is released by means of a pair of springs 65 which encircles the inner ends of a pair of rods 66 passed through the front frame member 1 and through two depending lugs 67 extending from the bearings 22 of the swing frame. The springs encircle the rods in the rear of the frame member 1 and exert an inward pull upon the lugs 67 which tends to swing the frame away from the machine, see Figs. 1, 2, 3 and 5.

*The automatic starting and stopping mechanism.*—The mechanism for automatically starting and stopping the machine is illustrated in Figs. 1, 2, 3, 4, 5, 6, 16 and 17, to which reference will be had in the following description. The clutch which is carried by the pinion 13 on the counter shaft 9, consists of a disk 68 to the rear face of which are bolted clutch blocks 69. The periphery of these clutch blocks is shaped to the form of a truncated cone, which is adapted to frictionally engage with a corresponding conical or tapering surface formed on the pulley 12, see Fig. 6. The clutch and its supporting pinion 13 are prevented from moving longitudinally on the shaft 9 by a collar 70 fastened to the shaft by a set screw, but are free to rotate thereon. The driving pulley, however, is not only free to rotate on the shaft, but also has a sliding movement thereon toward and from the clutch. It is moved by means of an arm 71 which is supported upon the rear end of a transverse horizontal sliding bar 72 and has its end encircling the hub of the pulley. The transverse horizontal bar 72 is slidably supported in bearings 73 formed at the outer extremities of lateral extensions 74 on the front and rear frame members 1 and 2 and is moved to bring the pulley 12 into frictional contact with the clutch blocks 69 by means of a comparatively heavy compression spring 75 which encircles the bar between one of the bearings 73 and an adjustable collar 76 fastened thereon by a set screw. The sliding bar 72 is normally held in its rearward position with the spring under compression and the pulley disengaged from its clutch, by means of a toggle, lever and wedge device which consists of a horizontal, inwardly extending arm 77 rigidly fastened to the sliding bar by set screws; a perpendicularly arranged bell crank 78 pivotally supported upon a pin 79 at the inner end of the horizontal arm 77; a link 80 connecting the horizontal member of the bell crank to the upper extremity of a lever 81 which is fulcrumed on a horizontal pin 82 extending from an inwardly projecting lug 83 on the front frame member 1, and carries a roller 84 at its lower extremity; and a wedge 85 is arranged upon the outer lateral surface of the cam 56 and adapted to operatively engage the roller 84, see Fig. 16. A spring 86 has its upper and lower ends fastened to lugs extending respectively from the horizontal member of the bell crank 78 and from the lever 81 at a point below the fulcrum 82. This spring serves not only to normally maintain the roller 84 in operative contact with the wedge 85 but also to spread the toggle composed of the bell crank 78 and link 80 so as to bring its pivots in a straight line. To take up wear and allow for adjustment, a stop is provided which consists of a vertical lug 87 on the inwardly extending arm 77, and a set screw 88 passed horizontally through a lateral lug 89 formed integral with the vertical member of the bell crank 78. This set screw is adapted to contact with the vertical lug 87 and so limit the movement of the bell crank in one direction.

The toggle is broken to permit the forward movement of the sliding bar 72 so as to bring the pulley 12 into frictional contact with the clutch, by a latch which is carried by a transverse horizontal sliding bar 90. This bar 90 is slidably supported in openings in the front and rear frame members 1 and 2 and is located diagonally above the other sliding bar 72. It is preferably made square in cross section so as to prevent rotation in its bearings and has its front end projecting a short distance beyond the frame member. The latch is pivoted to this bar 90 by a bolt 91 and has a horizontal flat portion 92 which rests upon the bar, a depending lug 93 at the end of this flat portion opposite the pivoting bolt 91 which extends downwardly outside the bar and is adapted to engage the vertical member of the bell crank 78 when the bar 90 is moved in one direction, an inwardly extending portion 94 located opposite the depending lug 93 and having an oblique edge; and a lug 95 extending inwardly from the flat portion 92 between the portion 94 and pivoting bolt 91 and which is provided with a pocket in which a coiled spring 96 adapted to bear against the square sliding bar 90 is seated. The bar 90 is normally maintained in its forward position by means of a coiled compression spring 97 which encircles the bar between the rear frame member 2 and a collar 98 adjustably secured to the bar by a set screw. Another collar 99 adjustably secured by a set screw to the bar 90 between the latch and the front frame member 1, serves as a stop to limit the forward movement of the bar, see Fig. 16. The sliding bar 72 also carries a brake for the purpose of instantly stopping the machine at the end of each revolution, so that the momentum of the moving parts will not carry them beyond the proper stopping position. This brake consists of an arm 100 secured at its outer end to the sliding bar 72 by set screws and having its inner end formed in the shape of a ring 101 which encircles the hub of the clutch disk 68. As will be noted in Fig. 6, the opening in the ring 101 is considerably larger than the hub of the disk so that the two parts do not contact with each other.

The ring 101 carries clutch blocks 102 similar to the clutch blocks 69 and fastened in place in like manner. These clutch blocks 102 are adapted to frictionally engage with the tapered wall of a conical depression 103 formed in the side of the clutch disk 68.

It will readily be seen that when the sliding bar 72 is shifted to disengage the pulley 12 from the clutch blocks 69, the clutch blocks 102 will be brought into engagement with the clutch disk 68 and instantly cease its rotation. The arms 71 and 100 are united by a tie bar 104 to more firmly secure them in place on the bar 72 and so prevent the movement of one independent of the other.

*The staple forming and driving mechanism.*—The staple forming and driving mechanism is mounted upon the top of the machine and is arranged to project over the hoop form in front of the machine. In the following description of this mechanism, reference will be had to Figs. 1, 2, 3, 7, 18, 19, 20, 21, 22, 23 and 24, in which it will be noted that three staple formers and drivers 130 are shown arranged in battery form. It is obvious, of course, that machines may be constructed in accordance with this invention having a greater or less number of staple formers and drivers, the number being determined by the dimensions of the hoop or the particular desires of the user. As each is a counterpart of the other but one will be described in detail, the reference numerals, however, indicating like parts in each.

As above noted, each staple forming and driving device is located on the top of the machine, and consists of a housing 105 arranged vertically above the hoop form and having a rearwardly extending portion 106 through which a stud 107 passes to secure the housing to the top member 3 of the machine frame, and a vertical longitudinal slot 108 in which certain moving parts are contained. A two part cover 109 is secured to the housing by bolts 110 so that the slot 108 is open at the top and bottom, and the moving parts contained therein are held against displacement and accurately guided in their movement. These parts consist of a vertically movable cutting and forming die 111 having a comparatively long slot or opening 112 extending longitudinally upward from its bottom edge; a vertically movable operating bar 113 which, when the parts are in their normal position, extends into the housing to a point about midway from the top and has a depending tail piece 114 fastened thereto by rivets 115 which is operatively arranged in the slot 112 and serves as a driver or hammer; and a pivoted die or anvil 116 which is pivotally hung on a transverse horizontal pin 117 between two lugs or ears 118 projecting from the outer lateral surface of the housing 105 and has its upper and lower extremities 119 and 120, bent at an angle and extending through openings 121 and 122 into the interior of the housing, see Fig. 19. The operating bar 113 is also provided with a longitudinal slot 123 into which the upper bent end 119 of the pivoted anvil is adapted to enter at certain stages of the operation.

A guide block 124 is located in the lower portion of the slot 108 in the housing, being fastened in place by rivets, as shown in Fig. 18. It serves as a guide for the lower end of the cutting and forming die 111 and also contains a slot or opening 125 through which the lower bent end 120 of the pivoted anvil passes and is guided, see Figs. 18 and 19. The bottom edges of the cutting and forming die 111 and the driver or hammer 114 are grooved as shown at 126 to receive the wire 127 from which the staple is to be formed; and the edges of the longitudinal slot 112 are also grooved as shown at 128, to receive short lateral projections 129 on the sides of the driver or hammer which slide in the grooves 128 and guide the hammer in its travel.

A horizontally extending cutting die 130 is seated in a lateral depression in the rear extension 106 of the housing and is fastened in place by a block 131 which is secured to the extension 106 by a bolt. The front end of the cutting die 130 is beveled as shown at 132 in Figs 18, 19 and 20, and enters the slot 108 of the housing through an opening 133 in the rear wall thereof. The rear edge of the cutting and forming die 111 is similarly chamfered or beveled as shown at 134 in Figs. 18 and 20, and these two beveled edges operate together to cut the wire 127 obliquely so as to leave a pointed end. The top edge of the cutter 130 is also grooved to receive and guide the wire 127, as shown in Fig. 19.

A transverse pin 135 is slidably supported in an opening in the side of the housing below the pivoting pin 117 of the anvil 116 and has its outer end in contact with the anvil and its inner end rounded and adapted to be operatively engaged by the beveled or wedge shaped lower end 136 of the operating bar 113 as it moves downward. It will readily be seen that when this occurs the anvil 116 will be moved on its pivot 117 and its lower end 120 swung out of the path of the descending hammer 114 to permit the passage of the staple and its driver.

The operating bar 113 and the cutting and forming die 111 move in unison through a portion of their operation, and while thus coacting are locked together by a dog 137 which is pivotally suspended from a horizontal pin 138 projecting from the operating bar and has its lower end notched and adapted to engage the upper rear corner of the cutting and forming die 111. The dog is held against displacement from the pin 138 by a recessed collar 139 which is fastened to the pin by a set screw, and contains a coiled spring 140. This spring has its ends fastened, respectively, to the collar 139 and the dog 137 and serves to maintain it in contact with the cutting and forming die 111.

The lower extremity of the dog 137 is bent outwardly at right angles as shown at 141, and this bent end is adapted to co-act with a beveled portion 142 of the cover 109 of the housing, to release the dog from the cutting and forming die 111 and permit the operating bar 113 to continue its operation while the die 111 remains stationary, see Fig. 7.

The operating bar 113 is moved up and down in a vertical direction by means of a rock arm 143 which has its rear end pivotally mounted upon a transverse horizontal pin 144 supported in the upper end of an upright bracket 145 fastened to the rear of the top frame member 3 by bolts 146 and its front end forked as shown at 147 to receive and hold a flanged block 148 through which a screw threaded bar 149 is screwed and adjustably fastened by lock nuts 150, see Fig. 7. This bar 149 carries a forked block 151 at its lower end which straddles the upper end of the operating bar 113 and is pivoted thereto by a pin 152. It will be noted that there are as many forks or bifurcations 147 at the front end of the rock arm 143 as there are staple formers and drivers and all the flanged blocks 148 are held against displacement by a transverse pin 153 supported by the end forks and passing in front of the blocks.

A heavy coiled spring 154 has its ends prolonged and bent, respectively, so as to hook around the projecting end of the pivot pin 152 and seat in a small opening in the top edge of the cutting and forming die 111. This spring serves to return the cutting and forming die 111, to its normal position with respect to the operating bar 113 after the operation of driving a staple is completed.

The rock arm 143 is operated by means of a cam 155 mounted on the main shaft 7 and a connecting rod 156 which has its upper end pivoted to the rock arm by a pivot pin 157 and its lower end bolted to a yoke which embraces the cam. The yoke is constructed as shown in Figs. 1, 2, 4, 5 and 6 and has two vertical side members 158 which straddle the hub of the cam and operate in a groove therein; a transverse upper member 159 formed integrally with the side members and a transverse lower member 160 secured by bolts to the lower ends of the side members and passing beneath the hub of the cam. The cam, which is shaped as shown in Fig. 4, is preferably formed integral with the cam 56 and operates between the transverse upper and lower members 159 and 160 of the yoke. The upper member may be provided with a lining strip 161 of hardened metal and the lower member may also be made of like material to resist wear.

*The wire feeding mechanism.*—The wire from which the staples are made is fed to the staple forming and driving mechanism at the very beginning of the machine's operation by mechanism illustrated in Figs. 1, 2, 7, 13 and 14. An upright bracket 162 is arranged upon the top 3 of the machine directly in the rear of the battery of staple formers and drivers, and extends entirely across said top being fastened in place by bolts 163, see Fig. 13. A transverse horizontal feed shaft 164 is journaled in bearings in the bracket 162 and carries the main feed rolls 165. These rolls are of a comparatively large diameter and are each provided with a semi-circular annular groove 166 of about the same diameter as the wire. The rolls are arranged upon the feed shaft so that the annular grooves are in a direct line with the grooves in the horizontal cutting dies 130 and are provided with hubs through which set screws 167 pass to fasten them to the feed shaft. Another transverse horizontal shaft 168 is supported by the bracket 162 being located below and in the rear of the feed shaft 164 and is preferably fixed in said bracket so as to be incapable of rotation. A series of parallel levers 169 are fulcrumed upon this shaft 168 and have wide bosses or bearings 170 through which the shaft passes, in order to give the levers firm support. Each lever is provided with a vertical slot immediately in front of the bearing 170 and a friction roller 171 is pivotally supported in this slot upon a transverse pin 172. The front end of each lever is formed to constitute a socket in which a coiled spring 173 is arranged so as to bear against the surface of the machine top 3 and exert an upward pressure upon the lever. This tends to force the friction roller 171 against the main feed rolls 165 and thus hold the wire in the groove 166. In order to provide a smoothly operating mechanism, the friction rollers may be provided with roller bearings 174, as shown in Fig. 13.

A flanged ratchet wheel 175 is securely fastened by a set screw to one end of the feed shaft outside the bracket 162 and a dog or pawl 176 carried at the upper end of a substantially upright lever 177 is adapted to operatively engage the ratchet wheel 175. The lever 177 is fulcrumed on a pin 178 carried in an inwardly projecting lug on the front frame member 1 and has a roller 179 attached to its lower extremity which is adapted to operatively engage a wedge shaped projection 180 on the front face of the cam 56, see Fig. 2. A spring is provided to return the lever to its normal position after it has operated the feed mechanism and it is also provided with an adjustable stop 182 by means of which its range of movement may be varied.

The wire is arranged in coils upon reels 183 which are rotatably supported upon an upright bar 184 carried by an adjustable bracket 185 secured to the rear of the upright bracket 145. It is led forward from the reels through openings in the bracket 145 to the feed rolls 165 and thence into the staple forming and driving mechanism through the grooves in the horizontal cutting dies 130.

A trough 186 is arranged upon the machine top immediately in front of the upright bracket 145 and is filled with oil soaked waste through which the wire passes on its way to the staple forming and driving mechanism. The purpose of this is to lubricate the wire so that it passes more easily through wet hoops and also to oil the dies and cutters which operate upon it.

In practice it sometimes happens that a staple is broken or bent while being driven through the hoop, and the operator desires to drive another in its place. To provide for this, a device is provided whereby the wire feed to either one or two of the staple formers and drivers is cut out of operation so that the hoop may be replaced in the machine and one or two staples driven where desired. This device consists of a rocking cam bar 187 arranged horizontally across the top of the machine in the rear of the feed mechanism, and having depending lugs at its ends through which cone pointed set screws 188 pass and enter conical depressions in the sides of the machine top 3. The surface of the cam bar 187 is provided with cam enlargements 189 adapted to co-act with adjustable set screws 190 carried in the rear ends of the parallel levers 169 which curve up and over the cam bar so that the set screws are centrally above it.

The cam bar is provided with an operating handle 191 by means of which it may be rocked on the cone pointed set screws 188 and a counterweight 192 to normally maintain the cam bar in a central inoperative position. It will readily be seen by referring to Fig. 9 that when the cam bar is rocked to bring one of the cam enlargements beneath the end of the set screw 190, the rear end of the lever will be elevated and its front end depressed so as to withdraw the friction roller 171 from contact with the feed roll 165 and thus remove the pressure from the wire. When the feed rolls are again rotated, this particular wire will not be fed, so that no staple will be formed and driven into the hoop. In this manner the machine can be instantly converted into a one staple or two staple machine if desired.

*The staple clenching mechanism.*—After the staple has been driven into the hoop, its projecting ends are bent over or " clenched." The mechanism for doing this is illustrated in Figs. 1, 2, 3, 5, 6, 7, 8, 11 and 12, in which a series of horizontal longitudinally extending parallel bars 193 are shown arranged immediately beneath the top of the machine. The rear ends of these bars are slidably supported in a bracket 194 which is fastened by a bolt 195 to the inside of the rear frame member 2 and their front ends pass through a comparatively large opening in the front frame member 1 and project beneath the staple formers and drivers. These bars are supported near their front ends by flanged rollers 196 carried by adjustable brackets 197 which are secured by bolts 198 to the inner side of the front frame member 1 in the manner shown in Fig. 7. A staple clenching device is arranged upon the projecting front end of each bar 193 and consists of a plate 199 which is riveted to the bar and has curved ends in which transversely arranged cylindrical metal blocks 200 are seated. The metal blocks are fastened in place by pins passed through and having their ends riveted into side plates 201, see Fig. 8.

In order to provide for the circular form of the hoop and to so arrange the clenching devices that they will operate squarely against the inside of the hoop, it is necessary to tilt the two side bars 193 at an angle as shown in Fig. 3. To allow for this, the rollers 196 upon which these bars are supported have beveled faces as shown in Fig. 10 and the rear ends of the bars are supported in adjustable blocks 202 which are secured by bolts 203 to the bracket 194, see Fig. 13.

It will be noted by referring to Figs. 3 and 7, that the front ends of the bars 193 and the clenching devices carried thereby enter the pockets 23 in the segmental hoop form when it is swung up into operative position. These pockets provide the necessary room for the operation of the clenching devices.

The bars 193 are shifted back and forth to move the clenching devices to and fro beneath the hoop to clench the staples, by means of a perpendicular rocking lever 204 which is operated by a cam 205 mounted upon the main shaft 7 in the rear of the cam 155. The rocking lever 204 is fulcrumed on a pin 206 carried in an inwardly projecting lug 207 on the rear frame member 2 and has a cross bar 208 at its upper end which is straddled by inverted U shaped metal plates 209 riveted to the undersides of the bars 193, see Fig. 7. The lower extremity of the lever 204 carries a roller 210 adapted to operatively engage in a cam slot 211 in the cam 205. This cam slot is formed so as to give a quick rocking movement to the lever 204 during a part only of the revolution of the main shaft.

In order to resist the back thrust on the main shaft 7 a friction block 212 of wood or other material is adjustably secured by bolts 213 to the rear frame member 2 and arranged so as to contact with the rear face of the cam 205. This block also serves as an additional brake to assist in stopping the rotation of the main shaft.

In the description of the automatic starting and stopping mechanism it is stated that the toggle was broken by a latch carried by a sliding bar 90 coming in contact with a bell crank 78. A device is provided to swing the latch out of the way during the return movement of the sliding bar so that the return of the bar will not be interfered with. This device consists of a vertically disposed block 214 which is adjustably clamped by bolts 215 to the connecting rod 156 and has an oblique edge 216 which is adapted to co-act with the oblique edge on the portion 94 of the latch during the downward movement of the connecting rod 156 and swing said latch outwardly on its pivot as shown in dotted lines in Fig. 17, so that the depending lug 93 will avoid the bell crank 78 as the latch is returned to its normal position by the release of the sliding bar 90.

The horizontal locking bar 60 is released from the swing frame 18 by the upward movement of the connecting rod 156. An adjustable block 217 is secured by a bolt 218 to the side of the vertical block 214 and is adapted to contact with the bar 60 and lift it upward, see Fig. 1, so as to disengage the hook end 62 from the lug 41 as the connecting rod 156 nears the end of its upward movement.

The operation of the machine is as follows: A barrel hoop 219 is placed around the hoop form with its overlapping ends on top of the form, as shown in dotted lines in Fig. 15, and the foot lever 34 depressed by pressure applied to the foot pad 37. The downward movement of the foot lever draws down the hooked bar 31 by means of the links 33 bringing the hook 32 at the upper end of the bar in contacting gripping position with respect to the lapping ends of a hoop and also pulling the swing frame 18 toward the machine frame. This is due to the fact that the swing frame 18 which carries the hoop form is provided at its lower end with a curved lateral outwardly extending portion 21 which is pivoted to outwardly exterior brackets 20 at a point exterior to or in the front of the bar 31, as shown in Figs. 1, 2 and 5 so that the tendency is to turn or swing the frame 18 backward on its pivot toward the machine frame, or from the position shown in Figs. 1 and 2 to the position shown in Fig. 7. As the swing frame 18 moves back it strikes against the front projecting end of the square sliding bar 90 and shifts it backward which causes the depending lug 93 on the latch 92 to strike against the vertical member of the bell crank 78 and rock said bell crank on its pivot pin 79 and thus break the toggle composed of the bell crank and the link 80, see Fig. 16. The instant this occurs, the sliding bar 72 is free to move and the spring 75 forces said bar forwardly thereby bringing the pulley 12 into contact with the clutch blocks 69 and frictionally locking them together, see Fig. 6. As the pulley is constantly rotating, it causes the friction clutch to rotate which in turn rotates the pinion 13 upon which it is supported. This rotates the spur gear wheel 14 and so revolves the main shaft 7. The cam 56 on the shaft 7 co-acts with the roller 55 and depresses the lever 49 which draws down on the connecting rod 52 and expands the hoop form thereby sizing the hoop as shown in dotted lines in Fig. 15. The same movement of the cam 56 rocks the upright lever 177 by means of the wedge shaped projection 180 which strikes the roller 179 on the lever and causes the dog 176 at its upper end to engage the ratchet wheel 175 and give the feed shaft a partial rotation, see Fig. 14. The rotation of the feed shaft causes the feed rolls 165 to revolve and feed forward a proper length of wire 127 into the staple formers and drivers.

When the wire has been fed forward the cam 155 operating in the yoke at the lower end of the connecting rod 156 draws down on said connecting rod, see Fig. 4, and causes a downward movement of the rock arm 143 which operates the staple formers and drivers. The operation of these devices is clearly illustrated in Figs. 18, 22, 23 and 24. During the first stage of the operation, the operating bar 113 and the cutting and forming die 111 move from the position shown in Fig. 18 to that shown in Fig. 22, cutting off the proper length of wire and carrying it down and placing it upon the bent end or anvil 120 of the pivoted die 116. The continued downward movement of these parts 111 and 113 causes the die 111 to bend the ends of the piece of wire down at right angles over the anvil 120 as shown in Fig. 23. When this stage of the operation is reached, the beveled lower end 136 of the operating bar comes into contact with the sliding pin 135 and causes said pin to force the pivoted die 116 outwardly, thereby removing the bent end or anvil 120 from the path of the staple which is frictionally held in the grooves in the die 111 by the spring of the wire. The parts 111 and 113 continue their downward movement until the die 111 reaches the overlapping ends of the hoop in which the staple has already been partially driven, see Figs. 7 and 24. By this time the dog 137 on the operating bar 113 has been released from the die 111 by reason of its bent end 141 contacting with and sliding along the beveled portion 142 of the cover 109 and withdrawing said dog, and the die 111 remains stationary while the operating bar with its driver or hammer 114 continues its downward movement and drives home the staple, see Figs. 11 and 12. The various parts of the stapling mechanism remain stationary in this position for a length of time sufficient for the cam 205 of the shaft 7 to impart a rapid to-and-fro movement to the parallel bars 193 through the medium of the rocking lever 204 and thus cause the cylindrical blocks 200 to rub across the inner surface of the hoops and bend the projecting ends of the staple, as shown in Figs. 11 and 12. This completes the operation of driving and clenching the staples. The various parts of the operating mechanism now return to their normal positions during the remainder of the revolution of the main shaft 7. As the shaft nears the end of its revolution, the wedge 85 on the cam 56 engages the roller 84 at the lower extremity of the lever 81 and shifts said lever so as to move its upper end rearwardly. As the toggle has by this time resumed its normal position, it forms an inflexible connection between the lever 81 and the sliding bar 72 so that the movement of the lever will shift the sliding bar rearwardly and disengage the pulley from the friction clutch. The same movement of the sliding bar sets the brake into the friction clutch and stops the machine. The hoop is now removed, another one placed in position and the operation is repeated.

The operation of sizing the hoop and forming the staple are performed simultaneously and are completed at the same time so that when the hoop is sized and in proper position to receive the staple, the staple is completed ready to be driven in the hoop. This materially increases the rapidity of operation of the machine.

I claim.

1. In a machine of the class described, a machine frame and a hoop form consisting of an upper member of semi-circular segmental form, a lower member of similar semi-circular segmental form hinged at one side to the upper member, a cross bar extending between the lower end of the upper member, a depending vertical frame member pivoted at its lower end to the machine frame and rigidly secured at its upper end to the cross bar of the upper member, a foot treadle and a connecting rod pivoted at its lower end to the foot treadle and at its upper end to the depending vertical frame member at a distance above its lower pivoting point.

2. In a machine of the class described, a machine frame and a hoop form consisting of two semi-circular segmental members hinged together at one side; the upper member being provided with a cross bar extending between its lower ends, a depending vertical frame member pivoted at its lower end to the machine frame, and rigidly secured at its upper end to the cross bar of the upper member, and means connected to the depending vertical frame member for swinging the hoop form into hoop stapling position, and also expanding said hoop form.

3. In a machine of the class described, a main frame having an outwardly projecting portion, a vertical swing frame pivoted at its lower end to the outwardly projecting portion of the main frame, an expansible hoop form rigidly fastened to the upper end of the vertical swing frame, stapling mechanism supported in the main frame and a single manually operated means for simultaneously swinging the swing frame into stapling position and also expanding the hoop form.

4. In a machine of the class described, a machine frame, stapling mechanism in said frame, an expansible hoop form consisting of two hinged together members one of which is pivotally supported from the machine frame, and manually swinging and expanding means having a rod connected to the other member.

5. In a machine of the class described, a machine frame, stapling mechanism in said frame, an expansible hoop form consisting of two hinged together members one of which is pivotally supported from the machine frame, a foot treadle, and a rod connecting the foot treadle to the other member of the hoop form.

6. In a machine of the class described, a main frame having an outwardly projecting portion, a vertical swing frame pivoted at its lower end to the outwardly projecting portion of the main frame, an expansible hoop form rigidly fastened to the upper end of the vertical swing frame, stapling mechanism supported in the main frame and a single manually operated means for simultaneously swinging the swing frame into stapling position and also expanding the hoop form; said means including a foot treadle and a connecting rod extending from the foot treadle and connected to the vertical swing frame.

7. In a hoop stapling apparatus of the character designated, the combination with stapling mechanism, of a swinging hoop former, a foot treadle connected to the hoop former for swinging the same into position for stapling, and means automatically actuated by the swinging movement of the hoop former for clamping the ends of the hoop on the former, substantially in the manner and for the purpose described.

8. In a hoop stapling apparatus of the character designated, the combination with stapling mechanism, of a swinging hoop former, a foot treadle connected to the hoop former for swinging the same into position for stapling, mechanism for automatically clamping the ends of the hoop in position on said swinging former as it swings into stapling position, and means for automatically releasing such clamping mechanism as it swings back out of position, substantially in the manner and for the purpose described.

9. In a hoop stapling machine, a machine frame, and a swinging hoop former consisting of a fixed upper segmental section, a lower segmental section pivotally suspended at one end from said upper section and a vertical member fastened at its upper end to the fixed upper section and pivoted at its lower end to the machine frame.

10. In a hoop stapling machine, a machine frame, and a swinging hoop former, consisting of a fixed upper segmental section, a lower segmental section pivotally suspended at one end from said upper section; said upper section having a cross bar and a vertical member fastened at its upper end to the cross bar of the upper member and pivoted at its lower end to the machine frame.

11. In a machine of the class described, a main frame and a hoop form composed of hinged together sections, a vertically depending member rigidly fastened at its upper end to one section and pivoted at its lower end to the main frame and means for moving the other section to expand the hoop form; said means being so constructed and arranged that it also swings the depending member on its pivot as it expands the hoop form.

12. In a machine of the class described, a main frame, an expansible hoop form, a depending member rigidly fastened at its upper end to said hoop form and pivoted at its lower end to the main frame and means for simultaneously expanding the hoop form and swinging the depending member on its pivot toward the main frame.

13. In a machine of the class described, the combination with stapling mechanism and a hoop form movable into and out of position with reference to the stapling mechanism, of a starting and stopping mechanism including a clutch which is automatically controlled by the movement of the hoop form.

14. In a machine of the class described, the combination with stapling mechanism, and a hoop form movable into and out of position with reference to the stapling mechanism, of a starting and stopping mechanism including an automatically engaged and disengaged clutch and a toggle connected to said clutch and the movable hoop form.

15. In a machine of the class described, the combination with staple driving mechanism of a hoop form movable into and out of operative position with respect to the staple driving mechanism and means whereby the hoop form expands to size a hoop fitted thereon as it moves into operative position relative to the staple driving mechanism.

16. In a machine of the class described, a swing frame carrying a hoop form, means for swinging said frame and staple driving mechanism automatically thrown in operation when the swing frame is swung in position.

EDWIN F. BEUGLER.

Witnesses:
GEORGE J. WEIN,
CARL SCHRAMM.